US012728984B2

(12) United States Patent
Cornborough et al.

(10) Patent No.: US 12,728,984 B2
(45) Date of Patent: Sep. 8, 2026

(54) ROTOR ASSEMBLY

(71) Applicant: Vertical Aerospace Group Ltd, Bristol (GB)

(72) Inventors: Mark Cornborough, London (GB); William Soukal-Walsh, London (GB); Sean Briscall, London (GB); James East, London (GB); Tiago Vasconcelos, London (GB)

(73) Assignee: VERTICAL AEROSPACE GROUP LIMITED, Bristol (GB)

( * ) Notice: Subject to any disclaimer, the term of this patent is extended or adjusted under 35 U.S.C. 154(b) by 77 days.

(21) Appl. No.: 18/569,053

(22) PCT Filed: May 25, 2022

(86) PCT No.: PCT/GB2022/051307

§ 371 (c)(1),
(2) Date: Dec. 11, 2023

(87) PCT Pub. No.: WO2022/258946

PCT Pub. Date: Dec. 15, 2022

(65) Prior Publication Data

US 2024/0286736 A1 Aug. 29, 2024

(30) Foreign Application Priority Data

Jun. 9, 2021 (GB) ...................................... 2108205

(51) Int. Cl.

| | |
|---|---|
| ***B64C 11/48*** | (2006.01) |
| ***B64C 11/50*** | (2006.01) |
| ***B64C 29/00*** | (2006.01) |

(52) U.S. Cl.

CPC ............. *B64C 11/48* (2013.01); *B64C 11/50* (2013.01); *B64C 29/005* (2013.01)

(58) Field of Classification Search

CPC ......... B64C 11/28; B64C 11/48; B64C 11/50; B64C 29/005; B64C 2027/003

See application file for complete search history.

(56) References Cited

U.S. PATENT DOCUMENTS

| | | | | |
|---|---|---|---|---|
| 4,768,630 A * | 9/1988 | Aubry | ..................... | F16F 9/145 192/3.21 |
| 6,622,962 B1 * | 9/2003 | White | ..................... | B64C 27/26 244/12.3 |

(Continued)

FOREIGN PATENT DOCUMENTS

| | | | |
|---|---|---|---|
| DE | 102020211638 A1 | 7/2021 |
| EP | 3459843 A1 | 3/2019 |

(Continued)

OTHER PUBLICATIONS

Nov. 8, 2021 International Search Report issued in International Patent Application No. PCT/GB2021/052021.

(Continued)

*Primary Examiner* — Sang K Kim
(74) *Attorney, Agent, or Firm* — EIP US LLP

(57) ABSTRACT

A rotor assembly includes a first rotor, a second rotor and a damper system. The first and second rotors are arranged to be rotated about a common axis for thrust generation by a drive system. The first rotor is rotatable about the common axis relative to the second rotor between a stowed configuration of the rotor assembly in which a rotor blade of the first rotor and a rotor blade of the second rotor are substantially angularly aligned and a deployed configuration in which the rotor blade of the first rotor and the rotor blade of the second rotor are angularly misaligned. The damper system is arranged to generate a damper force opposing the relative rotation between the first and second rotors in at least one of (Continued)

the direction towards the stowed configuration and the direction towards the deployed configuration.

18 Claims, 2 Drawing Sheets

(56) References Cited

U.S. PATENT DOCUMENTS

| | | | | |
|---|---|---|---|---|
| 9,284,962 | B2 | 3/2016 | Long et al. | |
| 10,494,088 | B1 | 12/2019 | Coralic et al. | |
| 11,254,425 | B2 | 2/2022 | Thalheimer et al. | |
| 2015/0132104 | A1 | 5/2015 | Long et al. | |
| 2015/0367935 | A1 | 12/2015 | Long | |
| 2016/0122013 | A1* | 5/2016 | Thompson | B64C 27/50 416/1 |
| 2019/0016459 | A1 | 1/2019 | North et al. | |
| 2019/0337614 | A1 | 11/2019 | Villa et al. | |
| 2020/0172236 | A1 | 6/2020 | George | |
| 2021/0101677 | A1* | 4/2021 | Thalheimer | B64C 11/48 |
| 2021/0253231 | A1* | 8/2021 | Ensslin | B64C 11/28 |

FOREIGN PATENT DOCUMENTS

| | | | |
|---|---|---|---|
| EP | 3495260 | A1 | 6/2019 |
| RU | 2702868 | C1 | 10/2019 |
| WO | 2019/109621 | A1 | 6/2019 |
| WO | 2021/010915 | A1 | 1/2021 |
| WO | 2021/155208 | A1 | 8/2021 |

OTHER PUBLICATIONS

Nov. 8, 2021 Written Opinion issued in International Patent Application No. PCT/GB2021/052021.

Jan. 19, 2021 Search Report issued in British Patent Application No. 2012264.4.

Aug. 2, 2022 International Search Report issued in International Patent Application No. PCT/GB2022/051307.

Aug. 2, 2022 Written Opinion issued in International Patent Application No. PCT/GB2022/051307.

Dec. 6, 2021 Search Report issued in British Patent Application No. 2108205.2.

U.S. Appl. No. 18/019,962, filed Feb. 6, 2023 in the name of James Peck et al.

* cited by examiner

ROTOR ASSEMBLY

TECHNICAL FIELD

The present disclosure relates to rotor assemblies. Aspects of the invention relate to a rotor assembly, a flying vehicle and method of controlling reconfiguration of a rotor assembly. Embodiments may have particular application in aircraft with distributed propulsion systems such as Vertical Take Off and Landing (VTOL) capable aerial taxis, though this is not intended to be limiting.

BACKGROUND

For the purposes of illustration the following background will be described in the context of VTOL aerial taxis. This is not however intended to be limiting.

Recent technology developments have enabled a new class of aircraft to be developed. These aircraft are capable of high cruise speeds and VTOL using a distributed electric propulsion system. A distributed electric propulsion system may allow high levels of safety via redundancy, low operating costs, and low noise signatures.

Nonetheless, challenges remain in terms of selecting the airframe and propulsion system architecture. A principle challenge is to configure the aircraft to be capable of efficient VTOL flight and efficient cruise at high speed whilst retaining adequate redundancy of all systems.

Some designs of aircraft utilise one or more vertical lift rotor assemblies comprising a stacked arrangement of multiple vertical lift rotors. The vertical lift rotors may be powered down for parts of the flight envelope (e.g. conventional flight such as cruise). During such parts of the flight envelope it may be important to minimise the drag created by the vertical lift rotors. One approach is to align the spanwise axis of all blades of each rotor in the stack with the flow direction of air past the airframe in conventional flight. This may call for the blades to be adjusted from a deployed to a stowed configuration, in which blades are aligned and oriented as desired. Challenges remain with existing approaches to performing stowing, maintaining the stowed configuration, performing deployment and maintaining the deployed configuration.

Existing mechanisms typically suffer from one or more difficulties including: relatively high complexity, undesirable failure modes (e.g. not failing safe), unreliability, high wear rates, excessive time required to verify successful deployment, high system weight and high maintenance complexity and/or cost of the stowing system.

It is an object of embodiments of the invention to at least mitigate one or more of the problems of the prior art.

SUMMARY OF THE INVENTION

According to a first aspect of the invention there is provided a rotor assembly comprising a first rotor, a second rotor and a damper system, the first and second rotors being arranged to be rotated about a common axis for thrust generation by a drive system and where the first rotor is rotatable about the common axis relative to the second rotor between a stowed configuration of the rotor assembly in which a rotor blade of the first rotor and a rotor blade of the second rotor are substantially angularly aligned and a deployed configuration in which the rotor blade of the first rotor and the rotor blade of the second rotor are angularly misaligned and where the damper system is arranged to generate a damper force opposing the relative rotation between the first and second rotors in at least one of the direction towards the stowed configuration and the direction towards the deployed configuration.

By allowing for the rotor assembly to adopt a stowed configuration, in which at least one blade of each rotor is aligned, the overall drag created by the first and second rotors when not in use (e.g. stationary) may be reduced, potentially decreasing the drag on a vehicle associated with the rotor assembly and potentially improving its fuel economy and/or range. The deployed configuration may by contrast be better suited to generating thrust when the rotor assembly is in use. In this regard the extent of the misalignment in the deployed configuration may be significant e.g. substantially 90°. The relative rotation of the first and second rotors may be considered to be a scissoring action.

The damper system may control the rate of, limit the extent of or prevent relative rotation between the first and second rotors in one or both directions depending on operating circumstances. Thus, the damper system may control stowing and/or deployment rate, which may be advantageous especially where passively generated forces such as drag and/or inertia associated with rotor acceleration or deceleration (as contrasted with an active control system such as a motor and actuator) are used in the deployment and/or stowing of the rotor assembly. Such forces may be less predictable and/or consistent than active control alternatives. However, omitting active control may reduce complexity and failure modes and/or reduce weight.

By controlling the rate at which the first and second rotors rotate relative to each other, the damper may reduce stress on the rotor assembly, particularly as relative rotation is halted at the point at which the stowed configuration or deployed configuration is reached.

Additionally, especially given generation of the damper force over substantially the whole range of motion of the first rotor relative to the second rotor, the damper system may reduce the extent of or prevent undesired deviations from the stowed or deployed configurations. For instance, were the rotor assembly to be in the deployed configuration and experience a rapid deceleration of the rotor system (e.g. as a consequence of a transient event) this might tend to cause a degree of relative rotation towards the stowed configuration. However, the damper may prevent or limit the extent and/or rate of such rotation in view of the damper force. Indeed relevant components (e.g. the damper system) and/or control authorities and/or operating envelopes etc may be designed (e.g. sized) so that under operational conditions the damper system is suited to providing this functionality. It may be for instance that the damper system is arranged so that the damper force is sufficient to substantially balance deceleration inertia forces of the rotor assembly tending to cause relative rotation towards the stowed configuration. Nonetheless, a desired transition time in terms of deploying and/or stowing may also be accounted for in the relevant design(s). Through its action in this regard the damper system may reduce the extent of any deviation from the stowed or deployed configuration caused by a transient, and any deviation may be corrected e.g. after the transient by a reversion to a more conventional balance of forces on the rotor assembly and in particular the first rotor.

In some embodiments torque from the drive system is delivered to the first rotor through the damper system. Indeed it may be that the torque is exclusively delivered through the damper system. Further, the torque may be delivered through the second rotor. This may provide a convenient way of allowing relative rotation of the first rotor with respect to the second rotor under particular operating conditions (i.e. balance of forces actuating the damper system) whilst still allowing driving of the first rotor by the drive system (i.e. the damper system transmitting at least some of the torque from the drive system to the first rotor).

In some embodiments the damper system is arranged such that the damper force increases substantially proportionally with increasing relative rotation rate between the first and second rotors. This may be desirable in order to adequately control the rate of relative rotation given the forces experienced.

In some embodiments the damper system comprises a fluid viscous damper. Thus the damper force may be generated by restricting the rate at which fluid is permitted to flow. Alternatives are also possible however, e.g. an elastomeric damper where friction is generated between an elastomer body and a moving body or an electromagnetic damper such as an eddy current damper where a conducting body has a force generated upon it as it passes magnets.

In some embodiments the damper system comprises a rotary damper. It may be for instance that the damper comprises one or more paddles rotatable within a chamber formed by a housing, the chamber being arranged to be fluid (e.g. liquid) filled. The one or more paddles may rotate with the first rotor e.g. they may be rigidly mounted to the first rotor, for instance via a paddle shaft extending axially from a hub of the first rotor. The housing may be mounted to an alternative structure that is static in terms of the rotation of the first rotor with respect to the second rotor. The housing may for instance be rigidly mounted to a drive shaft for driving rotation of the second rotor and/or rigidly mounted to the second rotor itself e.g. via a housing shaft extending axially from a hub of the second rotor. The one or more paddles may be at least a relatively close fit inside the chamber and may have one or more metering orifices (e.g. at their tips) which may provide the principle or only way for fluid to pass from one side of a paddle to the other. Respective limiting bodies which abut the paddle or paddles when the rotor assembly is respectively in the deployed configuration and the stowed configuration may also be provided in the chamber, thereby limiting the extent of possible relative rotation to between the deployed and stowed configurations. Alternatively, such limiting bodies or other limiting means providing similar functionality may be provided elsewhere, e.g. a location other than the chamber and/or indeed externally to the damper system.

In some embodiments the damper system is located between the first and second rotors.

In some embodiments the damper system is located adjacent respective hubs of the first and second rotors.

In some embodiments the damper system comprises a linear damper. The linear damper may for instance be connected at a first end thereof to the first rotor (e.g. to a blade thereof or to a hub thereof or structure rigidly mounted to the hub thereof) and at a second end thereof to the second rotor (e.g. to a blade thereof or to a hub thereof or structure rigidly mounted to the hub thereof). The first end may be, or may be mounted to, a piston and the second end may be, or may be mounted to, a cooperating cylinder. The linear damper could for instance be an oleo strut.

In some embodiments the first and second ends of the linear damper may be mounted to their respective first or second rotor at differing radial positions. Thus one end may be attached radially further out (e.g. on a blade) than the other (e.g. on the hub). This may be advantageous in terms of generating a desirable level of damper force for a given damper configuration.

In some embodiments the linear damper is arranged so that its longitudinal axis is oriented to be substantially aligned with the radial direction with respect to the first and second rotors. In some embodiments the linear damper is arranged so that its longitudinal axis is oriented to be more closely aligned with the radial direction with respect to the first and second rotors in the stowed configuration of the rotor assembly than the deployed configuration of the rotor assembly. This may mean that the longitudinal axis of the linear damper is consistently nearer alignment with the principal airflow direction. Additionally, there may be an increase in damper force as the rotor approaches the deployed configuration, which may be desirable.

In some embodiments the damper system comprises multiple linear dampers. It may be for instance that each damper is attached to a different blade of the first rotor. It may be that each blade of the first rotor has a corresponding linear damper. Such arrangements may be advantageous in terms of desired damper force generation and/or may allow for better balancing of forces on the components of the rotor assembly.

In some embodiments the rotor assembly is arranged such that the relative rotation occurring towards the deployed configuration is at least in part passively driven. It may be for instance that such rotation occurs due at least in part to a drag force on the first rotor caused by rotation of the first rotor about the common axis by the drive system. By way of further example it may additionally or alternatively be that such rotation occurs due at least in part to inertial forces resulting from acceleration of the first rotor about the common axis by the drive system. Thus, deployment may occur when drag force and/or acceleration based inertia force exceeds any force tending to maintain the stowed configuration. By deploying the rotor assembly using naturally generated forces in this way, a specific system to deploy the rotor assembly may be omitted, thereby potentially saving weight and complexity, reducing power consumption and/or reducing failure modes.

In some embodiments the rotor assembly is arranged such that the relative rotation occurring towards the stowed configuration is at least in part passively driven. It may be for instance that such rotation occurs due at least in part to an inertia force of the first rotor as power delivered by the drive system is reduced or terminated and/or as the drive system provides a braking force, resulting in a deceleration of the first rotor. As with passive deployment, this has the potential to allow for weight saving, reduced complexity, reduced power consumption and/or reduced failure modes.

In some embodiments the rotor assembly comprises a biasing means arranged to provide a force tending to rotate the first rotor towards the stowed configuration of the rotor assembly. The biasing means could for instance be a spring. Alternatively the biasing means may be active e.g. electromagnetically operating. The biasing means may assist in giving rise to the relative rotation for stowing and/or may assist in maintaining the stowed configuration. The biasing means could for instance be a spring. The provision of the biasing means acting towards the stowed configuration may be appropriate given the balance of forces. In particular, there may be a general reduction/absence of forces experienced in the stowed configuration and so the provision of the biasing means may serve to better maintain the stowed configuration.

In some embodiments the biasing means is torsional. It may for instance be that the biasing means is connected at a first end thereof to the first rotor (e.g. to a blade thereof or to a hub thereof or structure rigidly mounted to the hub thereof) and at a second end thereof to the second rotor (e.g. to a blade thereof or to a hub thereof or structure rigidly mounted to the hub thereof).

In some embodiments the biasing means is located between the first and second rotors.

In some embodiments the biasing means is located adjacent respective hubs of the first and second rotors.

In some embodiments the biasing means is linear. It may for instance be connected at a first end thereof to the first rotor (e.g. to a blade thereof or to a hub thereof or structure rigidly mounted to the hub thereof) and at a second end thereof to the second rotor (e.g. to a blade thereof or to a hub thereof or structure rigidly mounted to the hub thereof).

In some embodiments the first and second ends of the biasing means may be mounted to their respective first or second rotor at differing radial positions. Thus one end may be attached radially further out (e.g. on a blade) than the other (e.g. on the hub). This may be advantageous in terms of generating a desirable level of force on the first and second rotor by the biasing means.

In some embodiments the biasing means is arranged so that its longitudinal axis is oriented to be substantially aligned with the radial direction with respect to the first and second rotors.

In some embodiments the biasing means is arranged so that its longitudinal axis is oriented to be more closely aligned with the radial direction with respect to the first and second rotors in the stowed configuration of the rotor assembly than the deployed configuration of the rotor assembly. This may mean that the longitudinal axis of the biasing means is consistently nearer alignment with the principal airflow direction.

In some embodiments the biasing means is arranged so that its longitudinal axis is oriented to be more closely aligned with the radial direction with respect to the first and second rotors in the deployed configuration of the rotor assembly than the stowed configuration of the rotor assembly. Stiffness changes during deployment may favour a biasing means which starts more circumferentially aligned and becomes more radially aligned such that a restoring force reduces as re-configuration occurs towards the deployed configuration. Still further, the biasing means may be arranged to over-centre to better retain the rotor assembly in the deployed configuration. It may then be that the rotor assembly requires a jolt of deceleration to overcome this and begin re-configuration towards the stowed configuration.

In some embodiments the biasing means is combined in a unit with the damper system. It may be for instance that the spring is housed in the cavity of a rotary damper and acts between the paddle(s) and housing of the rotary damper or it may for instance be that the biasing means is contained within a cylinder of a linear damper and acts on a piston thereof. This may offer protection to the biasing means and may be efficient in terms of packaging.

In some embodiments to the extent that the rotor assembly remains in the deployed configuration whilst the first rotor is being driven by the drive system, the deployed configuration is maintained at least in part passively. It may be for instance that such maintenance of the deployed configuration occurs as a result of passive forces tending to maintain the deployed configuration (e.g. the drag force) exceeding passive forces tending to rotate the first rotor towards the stowed configuration of the rotor assembly. It may in particular be that the first rotor remains unlatched in the deployed configuration and/or unrestrained by any other active system provided to maintain the deployed configuration. Latches and other active retention systems might add weight and possible failure modes.

In some embodiments to the extent that the rotor assembly remains in the stowed configuration, the stowed configuration is maintained at least in part passively. It may be for instance that such maintenance of the stowed configuration occurs as a result of passive forces tending to maintain the stowed configuration (e.g. the inertia force and/or the force of the biasing means) exceeding passive forces tending to rotate the first rotor towards the deployed configuration of the rotor assembly. It may in particular be that the first rotor remains unlatched in the stowed configuration and/or unrestrained by any other active system provided to maintain the stowed configuration. Latches and other active retention systems might add weight and possible failure modes. In particular if a latch fails locked, it may not be possible to deploy the rotor assembly. However, where as may be the case here, the maintenance of the stowed configuration is based simply on the balance of forces as ultimately broadly controllable using the throttle for the rotor assembly, the system may fail safe in that deployment remains possible. As will be appreciated both deployment and stowing may remain possible in accordance with the present invention even where there is a failure of the damper system and/or biasing means.

In some embodiments the rotor assembly comprises a deployment end stop which prevents relative rotation between the first and second rotors beyond the deployed configuration in a direction from the stowed configuration towards the deployed configuration.

In some embodiments the rotor assembly comprises a stowed end stop which prevents relative rotation between the first and second rotors beyond the stowed configuration in a direction from the deployed configuration towards the stowed configuration.

In some embodiments the second rotor is rigidly mounted to a drive shaft of the drive system, thereby rotating with the drive shaft.

In some embodiments the first rotor is mounted to the drive shaft via a bearing. Thus there may be no or inconsequential direct transfer of torque from the drive shaft to the second rotor, torque instead being delivered via the damper system.

In some embodiments the first and second rotor blades are stacked. Thus the blades of each of the first and second rotor may rotate in substantially parallel planes. The rotors may also be separated. It may be that both first and second rotor blade are arranged to be mounted on the same side of a pylon arranged to support the rotor assembly.

In some embodiments a separation between the blades of the first and second rotor assemblies is less than substantially 100% of a mean aerodynamic blade chord length of the blades.

In some embodiments when in the deployed configuration the first and second rotors are arranged to act as a single lifting aerofoil.

In some embodiments all rotor blades of the first rotor are each substantively aligned with a respective rotor blade of the second rotor when the rotor assembly is in the stowed configuration. This may increase the potential for reduced drag performance for the rotor assembly.

In some embodiments each of the first and second rotors has exactly two blades. These blades may be diametrically opposed. This may further increase the potential for reduced drag performance for the rotor assembly, giving the opportunity for each blade to be substantially aligned in its spanwise direction with the direction of incoming air flow during at least some operating conditions of a vehicle using the rotor assembly.

In some embodiments the stowed configuration corresponds to an operating condition where the first and second rotors are not rotating and/or are rotating in a manner such that only negligible thrust is produced. By way of example the first and second rotors may reach the stowed configuration during a terminal stage of a shut-down process at which negligible thrust is produced prior to the rotation ceasing. When powering down, (e.g. power delivery shut-down), the rotor assembly may remain deployed until forces biasing towards the stowed configuration (e.g. inertia arising from deceleration and/or the biasing means force) exceeds forces biasing towards deployment (e.g. the drag force). The various material parts of the rotor assembly may be designed so that this occurs below an operating rotation rate of the rotor assembly at which an operational thrust is generated by the rotor assembly. Similarly, the rotor assembly may remain in the stowed configuration during an initial start-up phase during which negligible thrust is produced.

In some embodiments the deployed configuration corresponds to an operating condition where the first and second rotors are rotating at or above a rate sufficient to generate operating thrust levels.

In some embodiments the rotor assembly is arranged for use in generating thrust to power a flying vehicle. The flying vehicle may for instance be an aircraft such as a VTOL or short take-off and vertical landing (STOVL) aircraft and may be an aerial taxi.

In some embodiments the rotor assembly is a vertical lift rotor assembly. It may for instance be arranged to facilitate vertical flight and/or transitional flight where a substantial part of vertical lift generated is from the rotor assembly in addition to that generated by lift surfaces such as wings.

In some embodiments the vertical lift rotor assembly is a non-tilt vertical lift rotor assembly. That is, the rotor assembly may be a dedicated vertical thrust rotor assembly.

In some embodiments the rotor assembly may be arranged to be shut-down during conventional (e.g. cruise) flight and to adopt the stowed configuration to reduce the total drag produced by the blades of the first and second rotors. This may reduce the drag on the flying vehicle and thereby increase range and/or performance.

In some embodiments when in the stowed configuration the rotor blade of the first rotor and the rotor blade of the second rotor are arranged such that their longitudinal axes are substantially aligned with the incoming air flow direction during conventional flight. It may be for instance that the rotor blades (i.e. their spanwise axes) are substantially aligned with an axis that is parallel to a longitudinal axis of the flying vehicle. This may reduce the total frontal area presented by the rotor assembly and thereby reduce drag. Arrangement of the first and second rotor assemblies in this manner may be achieved by the drive system, which in a position control mode is driven to rotate the rotor assemblies to the required orientation. The drive system may provide torque to maintain this arrangement or another mechanism may be used.

In some embodiments the rotor assembly is arranged to be mounted to a wing of the flying vehicle. It may for instance be mounted via a pylon to the wing.

According to a second aspect of the invention there is provided a flying vehicle comprising the rotor assembly according to the first aspect.

According to a third aspect of the invention there is provided a method of controlling reconfiguration of a rotor assembly, the rotor assembly comprising a first rotor and a second rotor, the first and second rotors being arranged to be rotated about a common axis for thrust generation by a drive system and where the first rotor is rotatable about the common axis relative to the second rotor between a stowed configuration of the rotor assembly in which a rotor blade of the first rotor and a rotor blade of the second rotor are substantially angularly aligned and a deployed configuration in which the rotor blade of the first rotor and the rotor blade of the second rotor are angularly misaligned, the method comprising generating a damper force opposing the relative rotation between the first and second rotors in at least one of the direction towards the stowed configuration and the direction towards the deployed configuration.

BRIEF DESCRIPTION OF THE DRAWINGS

One or more embodiments of the invention will now be described, by way of example only, with reference to the accompanying drawings, in which.

DETAILED DESCRIPTION

Figure 1:
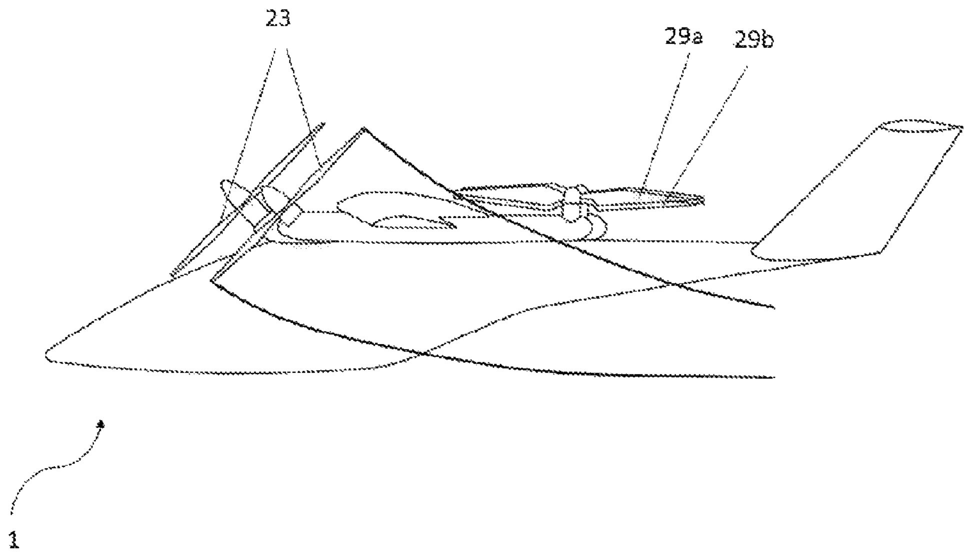
FIG. 1 shows a side view of a flying vehicle according to an embodiment of the invention.
Figure 2:
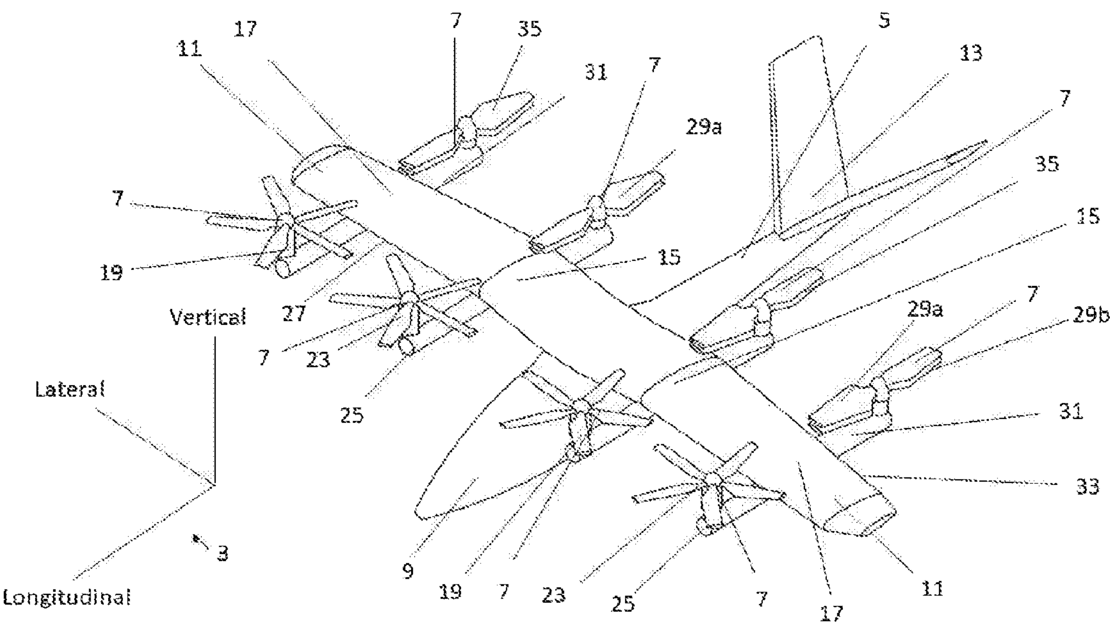
FIG. 2 shows a perspective view of a flying vehicle according to an embodiment of the invention.

With reference first to FIGS. 1 and 2, a flying vehicle, in this case a VTOL aerial taxi aircraft, is generally shown at 1. The aircraft 1 has longitudinal, lateral and vertical axes (see axes 3). The aircraft 1 has an airframe 5 and eight propulsion units 7 mounted to the airframe 5. The airframe 5 has a fuselage 9, a pair of wings 11 and tail assembly 13. A centreline of the aircraft and the chord of the wings 11 follow the longitudinal axis. The spanwise direction of the wings 11 substantially follows the lateral axis. The fuselage 9 comprises a passenger cabin (not shown) and a cockpit (not shown). In other embodiments however, the passenger cabin may be omitted or replaced (for instance with a storage area) and especially where the aircraft 1 is arranged for autonomous control or control from a remote location, the cockpit may be omitted.

The wings 11 of the aircraft 1 are high mounted on the fuselage 9 (i.e. extending from the top of the fuselage 9) and extend from a longitudinal position substantially consistent with the centre of gravity of the aircraft 1. The eight propulsion units 7 are mounted to the airframe 5 via the wings 11, with four per wing 11. Two on each wing 11 are mounted at inboard stations 15 at a position at approximately one third of the relevant wing's 11 span, one for and one aft of that wing 11. Two others on each wing 11 are mounted at outboard stations 17, at a position at approximately two thirds of the relevant wing's 11 span, one for and one aft of that wing 11.

Those propulsion units 7 forward of their respective wings 11 consist of a single rotor and are tilt-rotors 23. The tilt-rotors 23 are arranged under the influence of respective tilt-rotor control systems to transition by tilting through substantially 90° for alternate delivery of substantially vertical flight thrust and substantially conventional flight thrust, with a transition zone between the two. Each tilt-rotor 23 is mounted to the relevant wing 11 at the relevant station 15, 17 by a respective tilt rotor pylon 25. Each tilt rotor pylon

25 projects forward of a leading edge 27 of the wing 11, substantially normal to the leading edge 27. Each tilt-rotor 23 is mounted proximate to the distal end of the relevant tilt rotor pylon 25. Each tilt-rotor 23 itself therefore also projects substantially forward of the leading edge 27 and is arranged in a puller configuration. Each tilt-rotor 23 is powered, under the control of the tilt-rotor control system, by a corresponding drive system (not shown) comprising in this case a battery, a motor and a drive linkage. In other embodiments the drive system may be alternatively embodied (e.g. use of a fuel cell in place of the battery).

Those propulsion units 7 aft of their respective wings 11 are rotor assemblies and in this case are dedicated vertical lift rotor assemblies 29. Each rotor assembly 29 comprises a first rotor **29*a* and a second rotor 29*b*. Each rotor assembly 29 is mounted to the wing 11 at the relevant station 15, 17 by a rotor assembly pylon 31. Each rotor assembly pylon 31 projects rearward of a trailing edge 33 of the wing 11, substantially normal to the trailing edge 33. The first 29*a* and second 29*b* rotors of each rotor assembly 29 are mounted proximate to the distal end of the rotor assembly pylon 31 and themselves therefore also project substantially rearward of the trailing edge 33. The first 29*a* and second 29*b* rotors of each rotor assembly 29 are positioned on the same side of the respective rotor assembly pylon 31 (in this case above it). In this embodiment, the first 29*a* and second 29*b* rotors of each rotor assembly 29 are also mounted so as to be substantially above the horizontal plane that is aligned with the chord line of the wing 11 to which they are mounted. The first 29*a* and second 29*b* rotors of each rotor assembly 29 are oriented for vertical thrust generation and therefore each lies substantially in its own plane that is substantially parallel to the chord line of the wing 11** to which they are mounted.

The first **29*a* and second 29*b* rotors of each rotor assembly 29 are provided for delivering substantially vertical thrust only and they are therefore not tilt-rotors. Nonetheless, in some embodiments the first 29*a* and second 29*b* rotors of each rotor assembly 29 might have a limited degree of gimbling articulation e.g. to allow for modest stability corrections. The vertical thrust generated is for propelling the aircraft 1. In yet further embodiments the first 29*a* and second 29*b* rotors of each rotor assembly 29** may be provided as tilt-rotors (in which case the stowed configuration (discussed below) may for instance be used to accommodate more efficient lower speed cruise).

The first **29*a* and second 29*b* rotors of each rotor assembly 29 are of the same configuration and rotate about a common axis (e.g. extending in the direction of generated thrust which in this case is the vertical direction with respect to the aircraft 1) for thrust generation. Each of the first 29*a* and second 29*b* rotors of each rotor assembly 29 consists of two blades 35 extending in opposite directions and each having blade twist. The first 29*a* and second 29*b* rotors of each rotor assembly 29 are stacked and are mounted in close proximity to one another (in this case the separation is less than substantially 100% of a mean aerodynamic blade chord length of blades 35 of each of the first 29*a* and second 29*b* rotors of each rotor assembly 29). Each rotor assembly 29 also comprises a drive system (not shown), in this case comprising a battery, a motor and a drive linkage. In other embodiments the drive system may be alternatively embodied (e.g. use of a fuel cell in place of the battery). Each drive system drives both of the first 29*a* and second 29*b* rotors of the respective rotor assembly 29** in the same rotation direction for thrust generation. The power delivered by each drive system is controlled by a respective rotor assembly control system (not shown).

In use, the aircraft 1 is operable in conventional, transition and vertical flight and has different configurations for each of these flight modes.

During conventional flight (e.g. forward flight), the required lift is provided by the wings 11, with propulsion being delivered by the tilt-rotors 23 (controlled by the tilt-rotor control system under instruction from a flight controller) to be configured in a conventional flight mode (that is, with the planes of the blades of the tilt-rotors 23 substantially vertically aligned). During conventional flight, lift from the rotor assemblies 29 is not required and so the rotor assemblies 29 are configured in a stowed configuration. In the stowed configuration each blade 35 of each first rotor **29*a* is substantially angularly aligned with a blade 35 of the second rotor 29*b* in the same rotor assembly 29. Further, the blades 35 of the first 29*a* and second 29*b* rotors of each rotor assembly 29 are substantially aligned with an axis that is parallel to a longitudinal axis of the aircraft 1 (i.e. an incoming air flow direction during conventional flight), meaning that they present a relatively small total frontal area to the airflow in conventional flight. This is achieved by the drive system, which in a position control mode is driven to rotate the rotor assemblies to the required orientation and to maintain them in this orientation. Furthermore, due to the proximity of the first rotors 29*a* to the second rotors 29*b* in each rotor assembly 29 and the blade twist in the blades 35 thereof, one of the first 29*a* and second 29*b* rotors of each rotor assembly 29 is partially occluded by the other, so as to reduce the total frontal area by comparison with a theoretical scenario in which they are aligned as described above but are significantly separated (e.g. by a pylon) supporting them. Consequently, drag and noise produced by the rotor assemblies 29** when not in use during conventional flight may be reduced.

When it is desired to enter vertical flight, the flight controller begins to adjust the configuration of the aircraft 1 from the conventional flight configuration to a vertical flight configuration. Between the conventional and vertical flight configurations the aircraft 1 is in a transition configuration and performs transition flight. Where transition occurs from conventional to vertical flight, the transition configuration and flight is characterised by a steady reduction in conventional (i.e. forward) flight thrust as the flight controller instructs the tilt rotor control system to adjust the pitch of the tilt-rotors 23 to a vertical flight configuration (that is, with the planes of the blades of the tilt-rotors 23 substantially horizontally aligned). It is further characterised by a consequent reduction in lift provided by the wings 11. It is still further characterised by an increase in vertical thrust provided by both the tilt-rotors 23 as they are tilted and rotor assemblies 29 as they are powered up for vertical thrust generation by the flight controller via the rotor assembly control system and reconfigure to a deployed configuration.

The deployed configuration of each rotor assembly is achieved from the stowed configuration by relative rotation (e.g. scissoring) between the first **29*a* and second 29*b* rotors of that rotor assembly. The relative rotation is about the common axis (i.e. the thrust generating rotation axis) and is achieved in each case by rotation of the first rotor 29*a* relative to the second rotor 29*b*. In the deployed configuration, in each rotor assembly 29, the blades 35 of the first 29*a* rotor are angularly misaligned with the blades 35 of the second rotor 29*b*. In particular, in this embodiment the relative rotation is through substantially 90°, such that in combination, the first 29*a* and second 29*b* rotors of each rotor assembly 29 give a four blade system with the blades 35** equally spaced in an angular direction. In other embodiments however, the relative rotation may be by another angle, e.g. between substantially 40° and 90°. In particular the relative rotation may be substantially 45°.

In view of the proximity to each other of the first 29*a* and second 29*b* rotors in each rotor assembly 29, when in the deployed configuration, they effectively form a single lifting rotor of (in this case) four blades. This may increase efficiency and reduce noise by comparison with circumstances where the first 29*a* and second 29*b* rotors are separated by a greater distance (e.g. as enforced by an intervening pylon).

Once the vertical flight mode is reached, the aircraft 1 may be operated to hover or ascend or descend vertically (e.g. for vertical take-off or landing) via suitable adjustment to the thrust generated by the tilt-rotors 23 and rotor assemblies 29.

Where it is again desired to enter conventional flight, the previously described transition process can be reversed. This includes tilting the tilt-rotors 23, as they are tilted to their conventional flight configuration. It should further be noted that at least in some embodiments, the transition configuration may be maintained as a stable configuration, e.g. with the tilt-rotors 23 maintained at a selected tilt-angle among possible tilt angles between their tilt angle in the conventional flight configuration and in the vertical flight configuration. Additionally the rotor assemblies 29 may be stowed and deactivated or deployed and running to produce thrust in accordance with the vertical thrust required given parameters such as airspeed and the angle of the tilt-rotors 23.

The process of transitioning the rotor assemblies 29 between the stowed and deployed configuration and the associated features of the rotor assemblies 29 in accordance with a particular embodiment is now described with reference to FIG. 3. For simplicity, a single rotor assembly 29 is discussed, but as will be appreciated the explanation may also apply to one, some or all of the other rotor assemblies 29.

The drive linkage of the drive system of the rotor assembly 29 comprises a drive shaft. The second rotor 29*b* is rigidly mounted to the drive shaft, thereby rotating with the drive shaft as it is powered for thrust generation via the battery of the drive system, the first rotor 29*a* is mounted to the drive shaft via a bearing. Thus, there is inconsequential direct transfer of torque from the drive shaft to the second rotor 29*a*, torque instead being delivered via a damper system 45.

Figure 3:
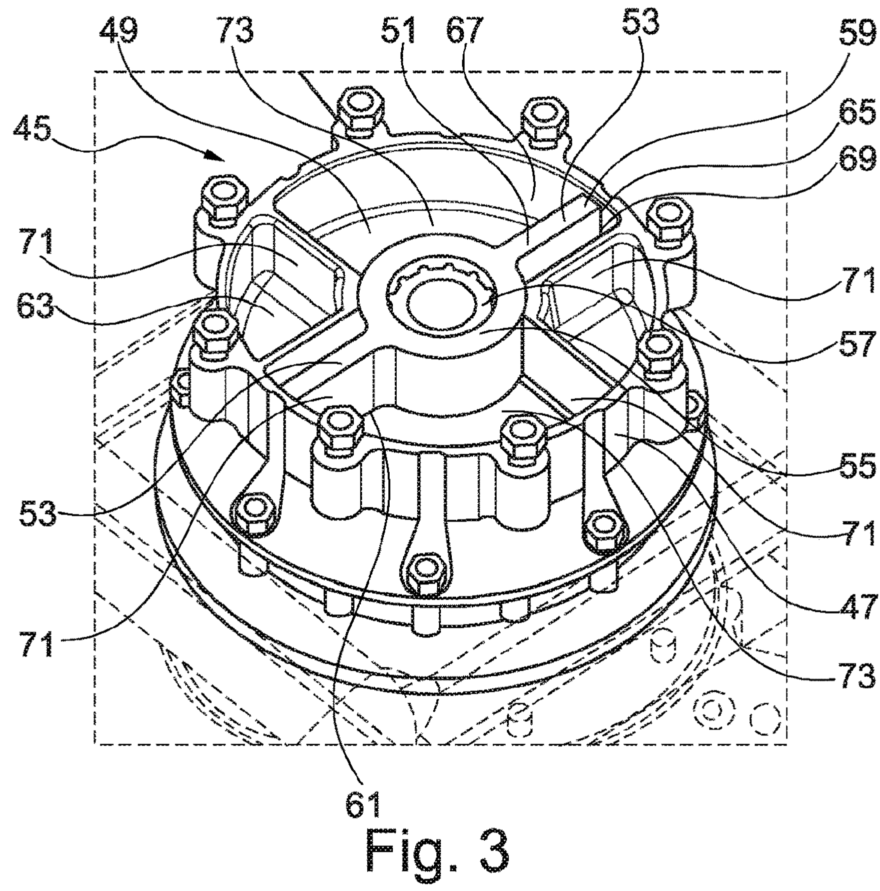
FIG. 3 shows a perspective view of part of a rotor assembly according to an embodiment of the invention.

In the case of FIG. 3, the damper system 45 is a fluid viscous damper, and is of a rotary damper configuration. It generates a damper force substantially throughout its actuation range (i.e. from an actuation position corresponding to the stowed configuration to an actuation position corresponding to the deployed configuration and vice versa) opposing relative rotation between the first 29*a* and second rotors 29*b* in both the direction towards the stowed configuration and the direction towards the deployed configuration. Furthermore, the damper force is substantially consistent throughout the actuation range for any given rate of relative rotation of the first 29*a* and second 29*b* rotors). The damper system 45 is located between the first 29*a* and second 29*b* rotors adjacent the respective hubs thereof.

The damper system 45 is formed in part by a housing 47 which defines therein a chamber 49 which is cylindrically shaped. The housing 47 is rigidly mounted to the drive shaft. The damper system further has a paddle assembly 51 comprising two paddles 53 extending in opposite directions from a paddle hub 55. The paddle assembly 51 is located within the chamber 49 and is mounted coaxially with the chamber 49 and to be rotatable therein. The paddle assembly 51 is rigidly mounted via its paddle hub 55 and an axially extending paddle shaft 57 to the hub of the first rotor 29*a*. The axis of rotation of the paddle assembly 51 within the chamber 49 is coaxial with the axis of rotation of the first rotor 29*a*. The paddle shaft 57 passes through a wall of the chamber 49 in a sealed manner to connect the respective hubs of the paddle assembly 51 and first rotor 29*a*. Each of the paddles 53 is a close fit inside the chamber 49. More specifically, the chamber 49 and paddles 53 are dimensioned so that when the paddle assembly 51 is mounted therein, the chordwise dimension of each paddle 53 is substantially equal to the length of the cylindrical chamber (i.e. respective top 59 and bottom 61 surfaces of each paddle 53 are in close proximity to respective top (not shown) and bottom 63 walls of the housing 47) and the tips 65 of each paddle 53 are in close proximity to a side wall 67 of the housing 47. In the present embodiment, limited clearance between the paddle tips 65 and the side wall 67 define metering orifices 69 providing substantially the only way for fluid to pass from one side of each paddle 53 to the other within the chamber 49. Additionally, radially extending walls within the chamber 49 define limiting bodies 71 (i.e. end stops), which limit rotation of the paddle assembly 51 in both the direction corresponding towards the deployed configuration and the direction corresponding towards the stowed configuration. In at least some embodiments the limiting bodies 71 may be formed from or comprise a flexible material (e.g. elastomer) to cushion engagement of respective paddle 53 with the respective limiting body 71. The limiting bodies 71 also sub-divide the volume of the chamber 49 to include a pair of sub-chambers 73, one paddle 53 being located in each sub-chamber. The sub-chambers 73 are arranged to be fluid (e.g. liquid) filled. The limiting bodies 71 may serve to limit the extent to which by rotating, each paddle 53 would simply push fluid ahead of it in a circumferential direction to fill a void vacated by fluid moved in a similar manner by the other paddle 53 and instead necessitate that displacement of fluid gives rise to corresponding flow of fluid through the respective metering orifice 69.

The operation and role of the damper system 45 as regards transitions between and maintenance of the deployed and stowed configurations is discussed further below.

It may be considered that initially, the rotor assembly 29 is in the stowed configuration. This corresponds to an operating condition where the first 29*a* and second 29*b* rotors are not rotating and/or are rotating in a manner such that only negligible thrust is produced. The blades 35 of the first 29*a* and second 29*b* rotors are aligned and the paddles 53 prevent further rotation in a direction from the deployed to the stowed configuration (i.e. over rotation) by their abutment with respective limiting bodies 71. In reaction to any force tending to rotate the paddles 53 in a direction corresponding to that from the stowed configuration to the deployed configuration, the damper system 45 generates a damper force opposing that rotation, in view of the limited rate at which fluid can move from one side of each paddle 53 to the other within the chamber 49. The damper force is thus generated by restricting the rate at which fluid is permitted to flow.

In the absence of powered rotation of the rotor assembly 29 by the drive system, particular forces which might otherwise be present are significantly reduced or absent (e.g. drag and acceleration based inertia on the first rotor 29*a*) tending to rotate the first rotor 29*a* in a manner towards the deployed configuration. Nonetheless, in the event of any forces (e.g. transient forces) occurring in this direction, the damper force would tend to retain the stowed configuration or limit deviation from the stowed configuration. To the extent that the rotor assembly 29 remains in the stowed configuration, the stowed configuration is therefore maintained at least in part passively (e.g. by natural balance of forces, and not requiring powered actuation and/or latching). In particular, the first rotor 29*a* remains unlatched in the stowed configuration and unrestrained by any other active system provided to maintain the stowed configuration. Though not utilised in the present embodiment, a biasing means such as one or more springs may be used (e.g. within the chamber 49) tending to rotate the paddle assembly 51 towards the stowed configuration of the rotor assembly 29, thus further contributing to the forces tending to maintain the stowed configuration. A biasing means could for instance be provided to act between each paddle 53 and the relevant corresponding limiting body 71.

As the drive system is powered up to rotate the rotor assembly 29 for thrust generation when transition and/or vertical flight is intended, torque is delivered directly to the second rotor 29*b* from the drive shaft. Torque is also delivered to the first rotor 29*a* through the damper system 45, via the rigid connection between the housing 47 and the drive shaft. As the housing 47 is rotated with the second rotor 29*b*, the damper force opposes relative rotation between the first 29*a* and second 29*b* rotors, such that initially the first rotor 29*a* rotates with the second rotor 29*b* and the stowed configuration is maintained. However, as the rotation of the rotor assembly 29 accelerates, acceleration based inertia and drag on the first rotor 29*a* tend to overcome the damper force (and any other forces tending to maintain the stowed configuration) and rotate the first rotor 29*a* relative to the second rotor 29*b* towards the deployed configuration of the rotor assembly 29. Substantially throughout this reconfiguration, the damper force limits the rate of relative rotation, thereby limiting forces experienced by the rotor assembly 29 at the point where the relative rotation is stopped once the deployed configuration is reached. Indeed, in this embodiment the damper force increases substantially proportionally with increasing relative rotation rate between the first 29*a* and second 29*b* rotors (though in other embodiments, alternative relationships between damper force and relative rotation rate may be delivered e.g. damper force increasing faster than proportionally with relative rotation rate, which may for instance be achieved by introducing a vortex flow restrictor into a damper system such as the damper systems described herein, or using a vortex flow restrictor as the damper system). The relative rotation towards the deployed configuration is ultimately stopped by abutment of the paddles 53 with respective limiting bodies 71. Throughout this process and beyond, torque continues to be delivered to the first rotor 29*a* via the damper system 45.

The relative rotation occurring towards the deployed configuration is at least in part passively driven (e.g. driven by natural balance of forces, and not requiring powered actuation and/or latching). That is, a drag force on the first rotor 29*a* caused by rotation of the first rotor 29*a* about the common axis by the drive system and/or acceleration based inertia at least contribute to driving the relative rotation. A specific system to deploy the rotor assembly 29 is omitted.

The deployed configuration corresponds to an operating condition where the first 29*a* and second 29*b* rotors are rotating at or above a rate sufficient to generate operating thrust levels (e.g. for transitional and/or vertical flight including for instance hovering). In these circumstances the drag force on the first rotor 29*a* will be sufficient under most circumstances to maintain the deployed configuration, exceeding any forces tending to cause relative rotation towards the stowed configuration. The damper force (this time acting in the opposite direction, but as before opposing any relative rotation in view of the limited rate at which fluid can move from one side of each paddle 53 to the other within the chamber 49) would also tend to maintain the deployed configuration. To the extent that the rotor assembly 29 remains in the deployed configuration whilst the first rotor 29*a* is being driven by the drive system, the deployed configuration is therefore maintained at least in part passively (e.g. by natural balance of forces, and not requiring powered actuation and/or latching). In particular, the first rotor 29*a* remains unlatched in the deployed configuration and unrestrained by any other active system provided to maintain the deployed configuration.

In the event of any forces (e.g. transient forces) occurring of sufficient magnitude to exceed the combined forces tending to maintain the deployed configuration (e.g. a rapid transient deceleration), the damper force would tend to limit deviation from the deployed configuration, potentially allowing a more rapid return to the deployed configuration once the relevant force (e.g. transient force) has abated.

As the drive system is powered down to discontinue rotation of the rotor assembly 29 and discontinue thrust generation for transition and/or vertical flight, the balance of forces on the first rotor 29*a* changes progressively. Specifically the drag force reduces and deceleration based inertia increases. The balance of forces eventually therefore favours rotation to the stowed configuration and the reconfiguration to the stowed configuration occurs. The reconfiguration (i.e. stowing) may start prior to the first 29*a* and/or second 29*b* rotors ceasing to rotate as powered by the drive system, and in some embodiments may be completed before such cessation of rotation. Substantially throughout the reconfiguration, the damper force limits the rate of relative rotation, thereby limiting forces experienced by the rotor assembly 29 at the point where the relative rotation is stopped once the stowed configuration is reached. Indeed, the damper force increases substantially proportionally with increasing relative rotation rate between the first 29*a* and second 29*b* rotors. The relative rotation towards the stowed configuration is ultimately stopped by abutment of the paddles 53 with respective limiting bodies 71.

The relative rotation occurring towards the stowed configuration is at least in part passively driven (e.g. driven by natural balance of forces, and not requiring powered actuation and/or latching). That is, an inertia force on the first rotor 29*a* as the drive system provides a braking force resulting in a deceleration of the first rotor, exceeds all other forces tending to retain the deployed configuration. A specific and/or dedicated system to stow the rotor assembly 29 is omitted.

In accordance with the above it is noted that operability in terms of reconfiguration between the stowed and deployed configuration continues in the event of damper failure. Nonetheless, operating under such circumstances may result in degraded life/increased maintenance requirements as a result of higher relative rotation rate between the first 29*a* and second 29*b* rotors.

Although in this embodiment a configuration is discussed in which the damper system 45 controls the rate of, limits the extent and prevents relative rotation between the first 29*a* and second 29*b* rotors in both directions depending on operating circumstances, in other embodiments the damper system 45 may have this effect in only one direction. This could for instance be achieved through use of an additional orifice, larger than the metering orifice 69, associated with each paddle 53, the passage of fluid through which is controlled by a non-return valve.

Figure 4:
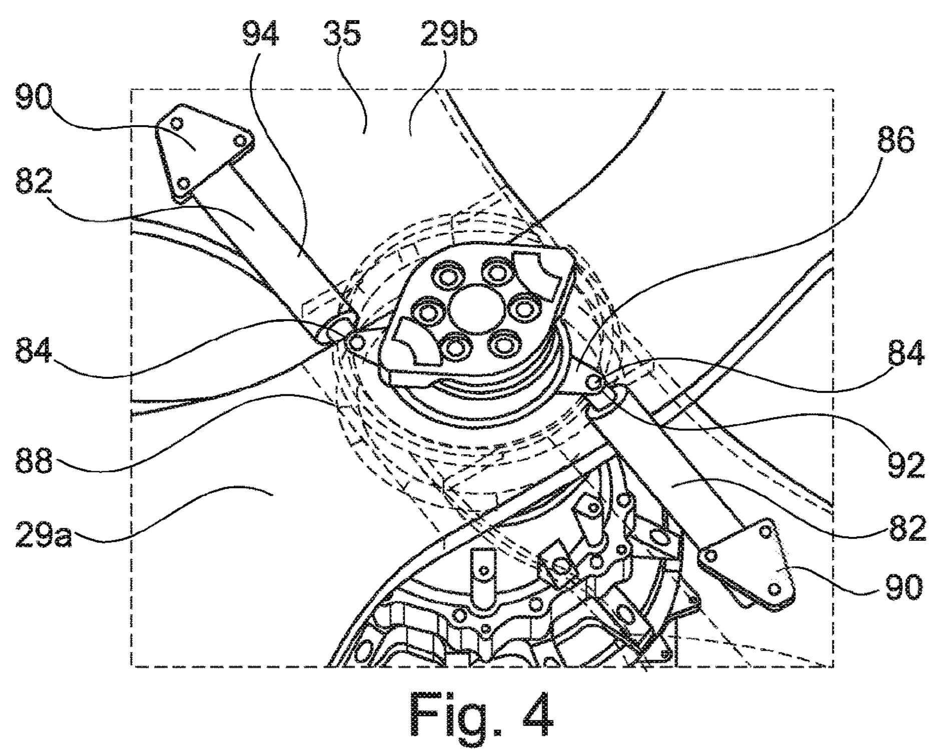
FIG. 4 shows a perspective view of part of a rotor assembly according to an embodiment of the invention.

Referring now to FIG. 4, an alternative damper system is generally shown at 80. The damper system 80 has the same effects as the damper system 45 of the FIG. 3 embodiment, but is different in its action. The damper system 80 comprises a pair of fluid viscous dampers 82 each in a linear damper configuration. Two dampers 82 are used in this embodiment for improved force balancing and increased effect, though in other embodiments an alternative number (e.g. one) of such dampers 82 may be used. Each damper 82 generates a damper force substantially throughout its actuation range (i.e. from an actuation position corresponding to the stowed configuration to an actuation position corresponding to the deployed configuration and vice versa) opposing relative rotation between the first 29*a* and second rotors 29*b* in both the direction towards the stowed configuration and the direction towards the deployed configuration. Furthermore, the damper force is substantially consistent throughout the actuation range for any given rate of relative rotation of the first 29*a* and second 29*b* rotors).

Below, for the sake of clarity, only one of the dampers 82 is described. Nonetheless, it will be appreciated that the description applies to both such dampers 82.

The described damper 82 is connected via a rotating joint at a first end 84 thereof to a structure (in this case a bracket 86) rigidly mounted to a hub 88 of the first rotor 29*a*. The bracket 86 is provided between the first 29*a* and second 29*b* rotors. A second end 90 of the damper 82 is connected to a blade 35 of the second rotor 29*b*. The first end forms part of a piston 92 of the damper 82, whilst the second end forms part of a cooperating cylinder 94 of the damper 82. The attachment point of the first end 84 to the bracket 86 is significantly radially inwards of the attachment point of the second end 90 to the blade 35 of the second rotor 29*b*. By comparison with a more radially inward position, the position of the attachment point of the second end 90 to the blade 35 offers greater leverage for the damper 82 in controlling and/or limiting and/or preventing (depending on prevailing operating conditions) relative rotation between the first 29*a* and second 29*b* rotors. Additionally, the relative radial positioning of the connections of the two ends 84, 90, allows the longitudinal axis of the damper 82 to remain oriented so as to be substantially aligned with the radial direction with respect to the first 29*a* and second 29*b* rotors.

The piston 92 is a close fit in the cylinder 94 with an orifice through the piston 92 providing limited flow of fluid to opposite sides of the piston 92. Thus, as with the rotary damper system 45, the damper 82 produces a damper force opposing the relative rotation between the first 29*a* and second 29*b* rotors in the direction towards the stowed configuration and the direction towards the deployed configuration. The end walls of the cylinder 94 function in a similar manner to the limiting bodies 71, preventing over rotation in both the direction towards the stowed configuration and the direction towards the deployed configuration, by limiting the extent of travel of the piston 92 in the cylinder 94.

Inside the cylinder 94 and acting between the cylinder 94 and piston 92 is a biasing means (in this case a spring) biased towards positioning the piston 92 within the cylinder 94 to a position corresponding the stowed configuration of the rotor assembly 29. The spring therefore assists in giving rise to the relative rotation for stowing and assists in maintaining the stowed configuration.

As noted above, two dampers 82 are used. Each has its first end 84 connected via a rotating joint to the bracket 86 and its second end 90 connected to a respective blade 35 of the second rotor 29*b* (that is each damper 82 is connected to a different blade 35 of the second rotor 29*b*).

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. By way of example, in the foregoing an aircraft having tilt-rotors is described, but the dedicated vertical lift rotor assemblies 29 would be equally applicable to aircraft having dedicated cruise rotors in place of the tilt-rotors. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A rotor assembly comprising a first rotor, a second rotor and a damper system, the first and second rotors being arranged to be rotated about a common axis for thrust generation by a drive system and where the first rotor is rotatable about the common axis relative to the second rotor between a stowed configuration of the rotor assembly in which a rotor blade of the first rotor and a rotor blade of the second rotor are angularly aligned and a deployed configuration in which the rotor blade of the first rotor and the rotor blade of the second rotor are angularly misaligned and where the damper system is arranged to generate a damper force opposing the relative rotation between the first and second rotors in at least one of the direction towards the stowed configuration and the direction towards the deployed configuration, and where the damper system comprises a rotary fluid viscous damper.

2. A rotor assembly according to claim 1 where torque from the drive system is delivered to the first rotor through the damper system.

3. A rotor assembly according to claim 1 where the damper system is arranged such that the damper force increases proportionally with increasing relative rotation rate between the first and second rotors.

4. A rotor assembly according to claim 1 arranged such that the relative rotation occurring towards the deployed configuration is at least in part passively driven.

5. A rotor assembly according to claim 1 arranged such that the relative rotation occurring towards the stowed configuration is at least in part passively driven.

6. A rotor assembly according to claim 1, wherein the first rotor is biased with a force to rotate it towards the stowed configuration of the rotor assembly.

7. A rotor assembly according to claim 6 comprising a biasing means that biases the first rotor with the force, and wherein the biasing means is combined in a unit with the damper system.

8. A rotor assembly according to claim 1 where to the extent that the rotor assembly remains in the deployed configuration whilst the first rotor is being driven by the drive system, the deployed configuration is maintained at least in part passively.

9. A rotor assembly according to claim 1 where to the extent that the rotor assembly remains in the stowed configuration, the stowed configuration is maintained at least in part passively.

10. A rotor assembly according to claim 1 where the second rotor is rigidly mounted to a drive shaft of the drive system, thereby rotating with the drive shaft.

11. A rotor assembly according to claim 1 where the first rotor is mounted to the drive shaft via a bearing.

12. A rotor assembly according to claim 1 where a separation between the blades of the first and second rotors is less than 100% of a mean aerodynamic blade chord length of each of the blades of the first and second rotor assemblies.

13. A rotor assembly according to claim 1 where each of the first and second rotors has exactly two blades.

14. A rotor assembly according to claim 1 where the rotor assembly is arranged for use in generating thrust to power a flying vehicle.

15. A rotor assembly according to claim 1 where the rotor assembly is a non-tilting vertical thrust rotor assembly.

16. A rotor assembly according to claim 1 where when in the stowed configuration the rotor blade of the first rotor and the rotor blade of the second rotor are arranged such that their longitudinal axes are aligned with an incoming air flow direction during forward flight.

17. A flying vehicle comprising the rotor assembly according to claim 1.

18. A method of controlling reconfiguration of a rotor assembly, the rotor assembly comprising a first rotor and a second rotor, the first and second rotors being arranged to be rotated about a common axis for thrust generation by a drive system and where the first rotor is rotatable about the common axis relative to the second rotor between a stowed configuration of the rotor assembly in which a rotor blade of the first rotor and a rotor blade of the second rotor are angularly aligned and a deployed configuration in which the rotor blade of the first rotor and the rotor blade of the second rotor are angularly misaligned, the method comprising a damper system comprising a rotary fluid viscous damper generating a damper force opposing the relative rotation between the first and second rotors in at least one of the direction towards the stowed configuration and the direction towards the deployed configuration.

* * * * *